United States Patent [19]

Campau

[11] Patent Number: 5,197,708
[45] Date of Patent: Mar. 30, 1993

[54] TUBING PINCH VALVE DEVICE

[75] Inventor: Daniel N. Campau, Grand Rapids, Mich.

[73] Assignee: Flow-Rite Controls, Ltd., Grand Rapids, Mich.

[21] Appl. No.: 928,511

[22] Filed: Aug. 11, 1992

[51] Int. Cl.⁵ ............................................. F16K 7/06
[52] U.S. Cl. ............................................ 251/8; 251/4
[58] Field of Search ....................................... 251/4, 8

[56] References Cited

U.S. PATENT DOCUMENTS

| | | | |
|---|---|---|---|
| 3,332,439 | 7/1967 | Burke | 251/8 X |
| 4,575,041 | 3/1986 | Hu | 251/8 |
| 4,576,593 | 3/1986 | Mommer | 251/8 X |
| 4,607,659 | 8/1986 | Cole | 251/8 X |

FOREIGN PATENT DOCUMENTS 1223498  8/1966  Fed. Rep. of Germany .......... 251/8

*Primary Examiner*—John C. Fox
*Attorney, Agent, or Firm*—Niro, Scavone, Haller & Niro

[57] ABSTRACT

A pinch valve is provided for controlling the flow in a flexible wall tube. The valve includes a slotted saddle with female threading to receive a male threaded stem which is actuated within the saddle by a knob integrally connected to the stem. The slotted saddle may be installed onto an existing tube run without requiring disconnection. The stem has a spherical tip which contacts the tube to collapse to decrease the area flow therethrough. The knob and saddle are closely fitted to prevent spreading of the saddle during high thread loads. Calibration is also provided so that a desired flow control can be repeated with accuracy.

14 Claims, 1 Drawing Sheet

U.S. Patent     Mar. 30, 1993     5,197,708
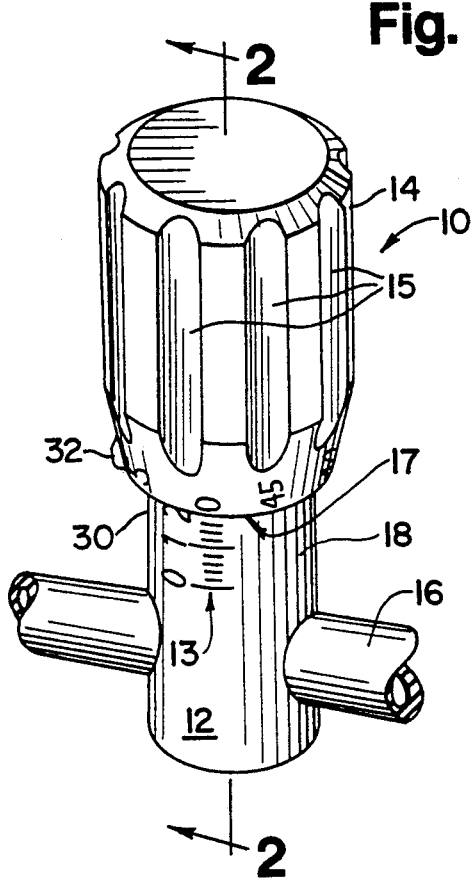
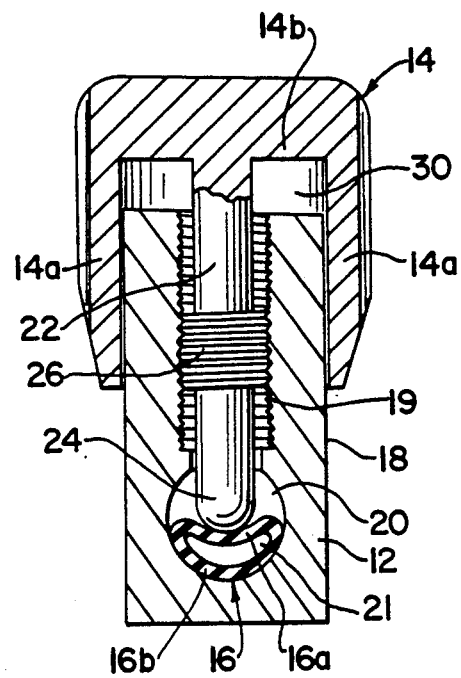
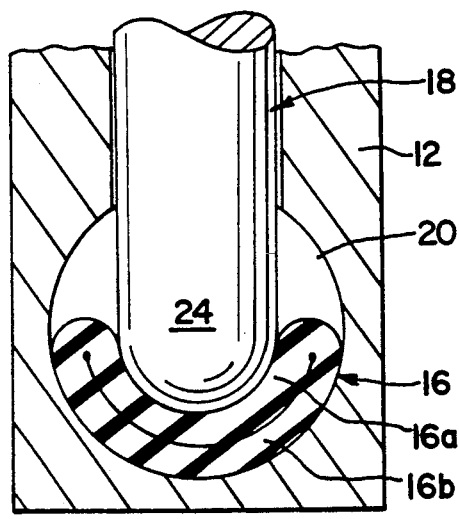

TUBING PINCH VALVE DEVICE

BACKGROUND OF THE INVENTION

The present invention is relates generally to a valve for the control of flow of liquids or gases. More specifically, the present invention relates to a tubing pinch valve used to control flow through a tube where the valve is compact and durable with the capability of precise flow adjustability.

It is well known in the art to employ pinch valves or clamps to constrict the flow of a liquid or gas through a line of tubing. In particular, pinch valves are often used with flexible plastic or rubber tubing for the control of flow. Known pinch valves have the advantage that they may be free from contamination by the process fluid and that they may be used reliably with flow material containing particulate.

Pinch valves generally employ a simpler construction than other valves used to control flows. As a result, pinch valves are less costly than other known valves which require seals or the like that must resist the corrosive effects of direct exposure to the process materials such as liquids. Valves that use seals require significantly more maintenance than pinch valves and are generally of a larger size making their use more cumbersome. Another advantage of pinch valves is that they may be designed to permit installation without disconnecting the tubing line. Such a feature is critical where, in some applications, disconnection of the tubing is not possible. Also, a pinch valve may be of the on/off type only, while others provide a means to vary the flow of material through the tubing. Variation of flow may be either continuous or incremental between the fully open and fully closed positions.

For example, a known type of pinch valve, a type 25R manufactured by Research Control Valves, uses a spherical ball to compress the tubing line. The ball is pushed, not rotated, into and against the wall of the tubing. External energy is required to maintain the spherical ball in its valve position. Such an apparatus is very bulky and is not appropriate for use with smaller sized tubing. The spherical ball valve apparatus is well suited for on/off applications but since it is devoid of any calibration, it is poorly suited for incremental flow control.

Similar prior art pinch valves employ a threaded stem with a bullet nose, for contact with the tubing line, that engages with a cooperating saddle with matching threads. An important feature of pinch valves is the ability to attach to an existing tube line without disconnecting it. Many of these prior art devices employ flow control but cannot be threaded onto an existing tube run.

Examples of such pinch valves are disclosed in U.S. Pat. No. 3,848,634, U.S. Pat. No. 3,332,439, U.S. Pat. No. 2,908,476, U.S. Pat. No. 3,167,085, and U.S. Pat. No. 4,312,493.

Known types of clamps have similar disadvantages as the pinch valves described above. For example, a KECK Ramp Clamp provides no calibration and has low mechanical advantage so its application is limited to a small range of tubing wall thickness and size. A compression of the tubing is required so true full flow cannot be realized. KECK Ramp Clamps are not suitable for manufacture in materials other than plastic nor vacuum applications.

Spring tubing clamps provide no calibration and may be used for on/off control only and are not suitable for vacuum applications. Ratchet tubing clamps provide no calibration and lack fine adjustment capabilities, particularly when the tube is compressed greater than 50%. Ratchet tubing clamps have low force capability and, as a result, are limited to lighter wall thicknesses and are not suitable for vacuum applications.

Steel tube clamps do not provide calibration and, due to their design, are suitable for manufacture in metal materials only and are not appropriate for small sized tubing. Further, screw clamps also do not provide calibration and have a weak design in plastic which is the only material appropriate for this design. A wide anvil is required because the screw clamp spreads the tubing out. Such a construction creates higher stresses and limits the application in light tubing.

Although these valves provide some advantages, the need still remains for a pinch valve that can operate over a wider range of tubing flexibilities which ultimately results in a wider range of pressure and vacuum conditions. There is a need to combine those advantages with the ability to adjust and repeat valve settings with accuracy. Tubing suitable for larger vacuum lines has relatively thick walls, requiring more force to squeeze the tubing closed. Plastic pinch valves are not appropriate for these applications because they are generally limited to low positive pressure applications with tubing having ½ outer diameter and smaller. Metal pinch valves capable of providing the force needed are susceptible to corrosion, bulky and are far more expensive than the plastic valves. The metal pinch valves are less suitable for small tubing sizes and are not readily provided with calibration to allow repeatable valve settings.

SUMMARY OF THE INVENTION

The present invention preserves the advantages of the prior art pinch valve devices. In addition, it provides new advantages not found in currently available pinch valve devices, and overcomes many of the disadvantages of such currently available devices.

The invention is generally directed to a novel and unique pinch valve device for adjusting the area and therefore the flow through flexible wall tubes. The preferred embodiment of the present invention has two major components: an integral knob and male threaded actuator with a free end having a spherical tube contact surface, and a cylindrical saddle which cooperates with the integral knob and actuator member. The saddle has a first hole with female threading to match the threading on the male threaded actuator and a second hole which is perpendicular to the axis of the first threaded hole. The first hole provides support and positioning for the integral member and the second hole provides support for the tubing routed through the device. Further, the saddle has a slot to allow the device of the present invention to be installed onto an existing tube run, without disconnection, by disengagement of the knob from the saddle and then reinstalling the knob. Upon re-engagement of the threaded integral member and knob portion of the device into the saddle, the knob covers the slot preventing the tubing from separating from the device.

The knob of the integral member preferably has an inside diameter which provides a sliding fit with the outside diameter of the saddle. This prevents the saddle from expanding and separating under high thread loads.

Overall, the pinch valve of the present invention provides a unique combination of advantages not found in prior art devices. In particular, the inventive pinch valves are robust and have high mechanical advantages which allow for the valves to be employed with a wide range of tubing materials and sizes. The valves may be used for both pressure and vacuum applications. The valves are simple in configuration and can be scaled to create a family of optimum sized valves for a broad spectrum of tubing sizes.

Unlike prior art devices appropriate for larger tubing sizes, the pinch valves of the present invention can accommodate larger sizes of tubing in a compact size while maintaining the economy of producing smaller valves. The valves are not limited to any one material, they can be manufactured in metal, plastic or whatever material is needed for the application. The valves can be equipped with a calibrated scale enabling needle valve type flow adjustability. Although the pinch valves of the present invention are preferably manually operated, they may be adapted for rotary motor actuation.

It is an object of the invention, therefore, to provide a novel and unique pinch valve that is compact in size and can accommodate a wide range of tubing sizes.

A further object of the invention is to provide a pinch valve that can be installed onto an existing tube run without disconnection of the tube.

It is still a further object of the present invention to provide a pinch valve that may be scaled in size according to the size of the tube to be controlled.

Yet another object of the present invention is to provide a pinch valve that can be manufactured of any material according to the application.

Another object of the invention is to provide a pinch valve with calibration so that flow control can be repeated with accuracy.

A further object of the invention is to provide a pinch valve that includes an integral knob portion that provides circumferential support for the saddle of the valve.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 1 is a perspective view of the preferred embodiment of the present invention installed onto an existing tube run;

FIG. 2 is a side view of the pinch valve of FIG. 1 taken along the section line 2—2, showing a male threaded member engaged with the saddle so that the bullet tip squeezes the tube; and FIG. 3 is a side view of the present invention with bullet tip squeezing the tube completely closed.

DETAILED DESCRIPTION OF THE PREFERRED EMBODIMENT

FIG. 1 shows the particularly preferred embodiment 10 of the present invention installed and in operation over a tube run. This preferred embodiment includes two primary components, a saddle 12 and knob 14. Tube 16 is threaded through saddle 12 and knob 14 is engaged with saddle 12 so that the flow of material, either liquid or gas, through tube 16 may be controlled by the actuation of knob 14 in and out of saddle 12. As knob 14 is actuated further into saddle 12, the more the flow through tube 16 is constricted.

Now referring to both FIGS. 1 and 2, it can be seen that the pinch valve 10 of the present invention includes saddle 12 of a substantially cylindrical shape. At an axis perpendicular to the central axis of the cylindrical saddle 12, exists a bore 20 which penetrates through the entire diameter of the saddle 12 in approximately in the lower third region of the saddle 12. Bore 20 is employed to accommodate a tube 16 of which its material flow therein is to be controlled. The shape of bore 20 is substantially cylindrical to assist in centering tube 16 routed therethrough in saddle 12. The cylindrical shape of bore 20 also assists in the ability to repeat valve settings. Saddle 12 also includes a slot 18 which is disposed through the entire width of the saddle 12 on a line parallel with the central axis of bore 20. Slot 18 starts at the very top of saddle 12 and extends downward to a cylindrical tube receiving passageway 20. On the inside walls of slot 18 is female threading 19 which is preferably 20 pitch in size. As a result, saddle 12 forms a substantially U-shaped structure for providing the support for the pinch valve 10 of the present invention.

Still referring to FIGS. 1 and 2, and integral knob and stem structure is provided which engages with saddle 12. In particular, knob 14 is connected to stem 22 to form a single structure having an annular recess 30. Stem 22 has a substantially spherical radius with male threading 26 disposed circumferentially around the approximate mid-section of stem 22. Male threading 26 is present on a wide enough portion of stem 22 and is elevated above the surface of stem 22 so that they may engage with female threads 19 without stem 22 touching the inside walls of slot 18. Further, stem 22 has a spherical-shaped contact tip 24 at its free end distal to its connection with knob 14. The spherical shape of tip 24 enables it to engage with tube 16 that is present in bore 20 during actuation of stem 22. During actuation of tip 24 into tube 16, the radius of tip 24 forces the wall of tube 16 to collapse inward, reducing the area of flow as compression increases. Further, it is preferable that the radius of tip 24 be large enough so that the tube can be closed tightly. Alternatively, a tip 24 with a smaller radius surface may be employed to prevent tube 16 from being closed entirely.

Connected to the end of stem 22 that is opposite to the end where tip 24 is located is knob 14. Knob 14 is substantially annular in shape and forms a cylindrical "cup" to cover the top portion of saddle 12. The center of lateral portion 14b of knob 14 is integrally connected to stem 22 to form a single structure. Knob 14 and stem 22 are preferably manufactured from a single mold. Knob 14 also includes a cylindrical vertical portion 14a which completely surrounds saddle 12. It is preferable that the inner diameter of the vertical portion 14a is slightly larger than the outer diameter of saddle 12. As a result a sliding fit can be realized between saddle 12 and knob 14. As shown in FIG. 1, knob 14 may also have grooves 15 to assist the user in the precise actuation of the knob and stem arrangement in and out of saddle 12.

The pinch valve 10 of the present invention has the ability to allow user to repeat flow controls values with accuracy. This advantage is accomplished through the use of calibration markings on the outer surfaces of the pinch valve. In particular, it is preferable that saddle 12 have numbered hash markings 30 representing a rough measurement of the depth that the knob and stem arrangement has actuated into saddle 12. Such a measurement is accomplished by reading the hash mark directly below leading edge 17 of knob 14. A fine tune measurement can also be realized by use of markings 32 on the surface of knob 14 in the area of vertical portion 14a. The number value on knob 14 aligned with vertical hash mark 13 assists the user in determining the precise depth at which the stem is disposed which is directly proportional to the amount that tube 16 is being collapsed and its associated rate of flow. The ability for a user to fine tune the amount of flow through tube 16 enables repeatable valve settings with accuracy.

In operation, the pinch valve of the present invention is separated into its two major components, saddle 12 and the knob 14 and stem 22 arrangement. Tube 16 is positioned into slot 18 and moved down into the bore 20 at the bottom of saddle 20. This method of loading tube 16 into the pinch valve is preferable because it obviates the need to disconnect tube 16. Alternatively, tube 16 may be threaded through bore 20 without first passing through slot 18. This method is only possible where tube 16 may be disconnected.

Once, tube 16 is positioned within bore 20, the stem 22 and knob 14 arrangement may communicate with saddle 12. First, tip 24 of stem 22 is passed downward in through the top portion of saddle 12 into slot 18. When tip 24 passes a predetermined distance into slot 18, male threading 26 on stem 22 communicate with female threading 19 on the inner walls slot 18. At that point, knob 14 is rotated in clockwise fashion causing stem 22 to rotate male threads 26. Similarly, the threading may be arranged so that a counter-clockwise movement of knob 14 engages the threads. As a result, male threads 26 engage with female threads 19 and tip 24 is actuated toward tube 16 present within bore 20.

When tip 24 is actuated far enough downward, it will eventually contact tube 16. Further, manual rotation of knob 14 will cause tip 24 to force the upper tube wall 16a to collapse inward reducing the flow area 21 inside tube 16. Alternatively, the pinch valve 10 may be adapted for rotary actuation of stem 22 by a rotary motor instead of by manual rotation. The more stem 22 is actuated downward by rotation of knob 14, the more tube 16 closes resulting in even less of a flow area 21. Moreover, since bore 20 is circular in cross-section, tube 16 will be centered for central contact by tip 24. As shown in FIG. 3, complete off control can be accomplished with the present pinch valve. When stem 22 is fully actuated into saddle 12, tip 24 will fully compress upper wall 16a of tube 16 into lower wall 16b so that flow area 21 is reduced to zero. At this point, flow of material in tube 16 is completely shut off.

During operation of the pinch valve, the user may employ calibration marks 30 and 32 to accurately record and then repeat different levels of flow control. For example, a reading on the calibration markings can be recorded at a point when the user is satisfied with the amount of flow through tube 16. Upon a subsequent use, the pinch valve can be set to the same markings that were determined to generate a desirable flow rate in a previous operation. With the present invention, that previous flow rate can be duplicated with accuracy and simplicity.

The present pinch valve can be manufactured in a compact size yet may accommodate relatively large tubing that requires considerable compression and thread shear strengths to maintain desired valve settings. This advantage is accomplished through the close fit of the saddle 12 within knob 14 in the area of its vertical portion 14a. Under the axial stem compression force, the slotted saddle 12 tends to spread which would, in turn, cause the threads to strip. To prevent spreading of saddle 12, it is preferable that the inner diameter of vertical portion 14a be slightly larger than the outer diameter of saddle 12 so that when stem 22 is engaged with saddle 12, vertical portions 14a surround the saddle providing it lateral circumferential support. As a result, a compact structure can be realized that can accommodate larger tubing and withstand larger axial compression forces.

Due to its design, the pinch valve of the present invention may be scaled as desired to create a family of optimum sized valves for a wide range of tubing sizes. For example, a tubing pinch valve family may include valves for the following tubing sizes: ⅛ O.D.; ¼ inch O.D.; ½ O.D.inch and ¾ inch O.D.

Overall, the present pinch valve is capable of attaching to an existing tube run without disconnection combined with a unique knob that laterally supports the saddle to prevent spreading. Further, calibration is provided so that flow control can be repeated with accuracy. The present pinch valve provides a compact unit employing various desirous features and advantages not found in previous valves.

It will be appreciated by those skilled in the art that various changes and modifications can be made to the illustrated embodiments without departing from the spirit of the present invention. All such modifications and changes are intended to be covered by the appended claims.

What is claimed is:

1. An apparatus for controlling the flow of liquid through a flexible wall tube, comprising:
   an externally threaded valve stem having first and second ends said first end having a tube contact surface;
   a valve cap integrally connected to said second end for rotation of said valve stem, said valve cap having a depending peripheral wall thereby defining an annular recess between said wall and said valve stem;
   a cylindrical saddle having a longitudinal bore internally threaded to receive said valve stem, a tube receiving slot extending from an open top end of said saddle to a cylindrical tube receiving passageway; and
   said annular recess being adapted to receive said top end of said saddle with the inside diameter of said wall being sized to provide, a sliding fit between said cap wall and said saddle to thereby constrain movement of the saddle when subjected to lateral forces.

2. The apparatus of claim 1, wherein said saddle is marked with a graduated scale calibration to indicate its relative position with said valve cap.

3. The apparatus of claim I, wherein said valve cap is marked with a graduated scale calibration to indicate its relative position with said saddle.

4. The apparatus of claim 1, wherein said valve cap and said saddle are marked to indicate their relative position to each other to represent the positioning of said valve stem in said saddle.

5. The apparatus of claim 1, wherein said apparatus is made of a non-metallic material.

6. The apparatus of claim 1, wherein said valve stem and said valve cap are made of non-metallic material and said saddle is made of metallic material.

7. The apparatus of claim 1, wherein said valve stem and said valve cap are made of metallic material and said saddle is made of non-metallic material.

8. The apparatus of claim 1, wherein said apparatus is made of metallic material.

9. The apparatus of claim 1, wherein said valve stem is actuated into said saddle by manual rotation of said valve cap.

10. The apparatus of claim 1, wherein said valve stem is actuated into said saddle by a rotary operator means for positioning said actuator engaged with said valve cap.

11. The apparatus of claim 10, wherein said rotary operator means is electric powered.

12. The apparatus of claim 10, wherein said rotary operator means is pneumatically powered.

13. The apparatus of claim 10, wherein said rotary operator means is hydraulic powered.

14. The apparatus of claim wherein said spherical contact surface of said free end of said externally thread valve stem has a spherical surface that is substantially complimentary in shape to the inner surface of said cylindrical tube receiving passageway to ensure that the wall of the flexible tube collapses inward in uniform fashion to constrict liquid flow.

* * * * *